(12) United States Patent
Liu

(10) Patent No.: US 12,519,504 B2
(45) Date of Patent: Jan. 6, 2026

(54) RADIO DATA COMMUNICATION SYSTEM AND METHOD

(71) Applicant: NXP USA, Inc., Austin, TX (US)

(72) Inventor: Changsheng Liu, Haidian (CN)

(73) Assignee: NXP USA, INC., Austin, TX (US)

( * ) Notice: Subject to any disclaimer, the term of this patent is extended or adjusted under 35 U.S.C. 154(b) by 71 days.

(21) Appl. No.: 18/479,856

(22) Filed: Oct. 3, 2023

(65) Prior Publication Data

US 2024/0223236 A1 Jul. 4, 2024

(30) Foreign Application Priority Data

Dec. 28, 2022 (CN) .......................... 202211714730.9

(51) Int. Cl.
*H04B 1/64* (2006.01)
*H03M 13/00* (2006.01)

(52) U.S. Cl.
CPC .......... *H04B 1/64* (2013.01); *H03M 13/6588* (2013.01)

(58) Field of Classification Search
CPC ........... H03M 7/3062; H03M 13/6588; H04W 28/065; H04L 69/04; H04B 1/64
See application file for complete search history.

(56) References Cited

U.S. PATENT DOCUMENTS

| | | | |
|---|---|---|---|
| 8,880,734 B2 | 11/2014 | Wegener | |
| 10,153,779 B1* | 12/2018 | Bordignon | H03M 7/24 |
| 2015/0280647 A1* | 10/2015 | Stanciu | H04L 27/2042 |
| | | | 375/302 |
| 2019/0347072 A1* | 11/2019 | Lo | G06F 7/49936 |
| 2020/0225948 A1* | 7/2020 | Sim | G06F 9/3802 |
| 2021/0397350 A1* | 12/2021 | Luo | G06F 3/0608 |
| 2023/0143476 A1* | 5/2023 | Vankayala | H04W 28/065 |
| | | | 370/230 |
| 2023/0292175 A1* | 9/2023 | Kong | H04W 28/06 |
| 2024/0089794 A1* | 3/2024 | Rossetti | H04W 28/0289 |

OTHER PUBLICATIONS

Vankayala et al, "A Novel Front-haul Bandwidth Compression Method for RAN Systems", 2020 IEEE International Conference on Advanced Networks and Telecommunications Systems (ANTS), Dec. 2020 (Year: 2020).*

Seok-Hwan Park, Osvaldo Simeone, Onur Sahin, and Shlomo Shamai (Shitz), Fronthaul Compression for Cloud Radio Access Networks, Digital Object Identifier 10.1109/MSP.2014.2330031, Oct. 15, 2014 (Year: 2014).*

(Continued)

*Primary Examiner* — Aristocratis Fotakis

(57) ABSTRACT

A radio data communication system includes a plurality of radio units, each radio unit having a transceiver and an antenna, and a gateway unit connected to each of the plurality of radio units via a first data bus. Each transceiver in the plurality of radio units is configured to receive a data signal from a respective antenna, compress the received data signal using a data compression algorithm, and transmit the compressed data signal to the gateway unit via the first data bus. The data compression algorithm includes a bit shifting operation performed by a multiply-accumulate operation.

14 Claims, 9 Drawing Sheets

(56) References Cited

OTHER PUBLICATIONS

Yunxiang Tang, Biao Long1, and Dake Liu, An ASIP design for low loss compression of front-haul data in 5G base stations, IEICE Electronics Express, vol. 18, No. 4, 1-6, Jan. 26, 2021 (Year: 2021).*

Marcos Silva, Leonardo Ramalho, Igor Almeida, Eduardo Medeiros, Miguel Berg and Aldebaro Klautau, A New O-RAN Compression Approach for Improved Performance on Uplink Signals, Journal of Communication and Information Systems 37(1):30-41, Feb. 2022 (Year: 2022).*

ORAN-WG4.CUS.0-v01.00, O-RAN Fronthaul Working group Control, User and Synchronization Plane Specification, 2019 (Year: 2019).*

Lee et al.: "A Simple and Efficient IQ Data Compression Method Based on Latency, EVM, and Compression Ratio Analysis"; IEEE Access; vol. 7; Jul. 2019; 12 pages.

* cited by examiner

RADIO DATA COMMUNICATION SYSTEM AND METHOD

CROSS-REFERENCE TO RELATED APPLICATION

This application claims priority under 35 U.S.C. § 119 to Chinese patent application no. 202211714730.9, filed 28 Dec. 2022, the contents of which are incorporated by reference herein.

The disclosure relates to compression or decompression of radio data communication signals using bit shifting operations.

FIELD

The disclosure relates to compression or decompression of radio data communication signals using bit shifting operations.

BACKGROUND

Open RAN defines various principles relating to specifications for the radio access network (RAN), including 5G radio data networks. This covers algorithms for eCPRI (enhanced common public radio interface) and IQ data compression or decompression. Compression and decompression operations may for example include block floating point, block floating point scaling and u-law algorithms. Block floating point algorithms involve removing a predetermined number of least significant bits from each word and concatenating the remaining bits. Block floating point scaling algorithms involve multiplying the time or amplitude of a signal by a constant. The u-law algorithm is a companding algorithm that reduces the dynamic range of a signal. These algorithms may for example be used to compress 16-bit IQ data into 6-15 bit IQ data to reduce data throughput.

Algorithms for compression and decompression in 5G radio data networks are typically performed by high-power processors, which are required to perform the necessary bit operations such as logic bit shift left, logic bit shift right and logic bit concatenation. One high power processor will typically perform compression and decompression algorithms on multiple streams of received data.

Digital signal processors (DSPs) may be better suited to high volume data processing than processors currently used to run 5G compression/decompression algorithms. This is because multiple DSP units may be configured in parallel to achieve a higher throughput compared with a single high-power processor. However, to reduce power consumption and hardware complexity, a DSP generally only supports a simplified instruction set that does not include bit shifting and concatenation, which are required by 5G compression algorithms.

SUMMARY

According to a first aspect there is provided a radio data communication system, comprising: a plurality of radio units, each radio unit having a transceiver and an antenna; and a gateway unit connected to each of the plurality of radio units via a first data bus, wherein each transceiver in the plurality of radio units is configured to: receive a data signal from a respective antenna; compress the received data signal using a data compression algorithm; and transmit the compressed data signal to the gateway unit via the first data bus, wherein the data compression algorithm includes a bit shifting operation performed by a multiply-accumulate (MAC) operation.

The radio data communication system may further comprise a distribution unit configured to: receive the compressed data from the gateway unit via a second data bus; decompress the compressed data; and transmit the decompressed data to a data network.

The transceiver of each radio unit may comprise a vector signal processor configured to perform the data compression algorithm.

The received data signal may comprise input binary words having a first number of bits and the compressed data signal comprises binary words having a second number of bits, the second number being less than the first number. The first number may be 16 and the second number may be selected from a range of from 6 to 15.

The data compression algorithm may concatenate the compressed data signal using a MAC operation to provide the compressed data signal with output binary words having the first number of bits.

For each input binary word in the received data signal, the data compression algorithm may: convert the input binary word into a floating point word; perform the bit shifting operation on the floating point word by performing the MAC operation; and convert the floating point representation into an output binary word, wherein the compressed data signal comprises the output binary word.

The bit shifting operation may be a right shifting operation, the MAC operation including multiplying the floating point word by $2^{-n}$, where n is the number of bits to be right shifted.

The bit shifting operation may be a left shifting operation, the MAC operation including multiplying the floating point word by $2^n$, where n is the number of bits to be left shifted.

The radio data communication system may be a 5G radio data communications system.

According to a second aspect there is provided a method of compressing a data signal in a radio data communication system comprising: a plurality of radio units, each radio unit having a transceiver and an antenna; and a gateway unit connected to each of the plurality of radio units via a first data bus, the method comprising each transceiver in the plurality of radio units: receiving a data signal from a respective antenna; compressing the received data signal using a data compression algorithm; and transmitting the compressed data signal to the gateway unit via the first data bus, wherein the data compression algorithm includes a bit shifting operation performed by a multiply-accumulate (MAC) operation.

The radio data communication system may further comprise a distribution unit, the method further comprising: the distribution unit receiving the compressed data from the gateway unit via a second data bus; decompressing the compressed data; and transmitting the decompressed data to a data network.

The data compression algorithm may be performed by a vector signal processor on each radio unit.

The received data signal may comprise input binary words having a first number of bits and the compressed data signal comprises binary words having a second number of bits, the second number being less than the first number. The first number may be 16 and the second number may be selected from a range of from 6 to 15.

The data compression algorithm may concatenate the compressed data signal using a MAC operation to provide the compressed data signal with output binary words having the first number of bits.

For each input binary word in the received data signal, the data compression algorithm may: convert the input binary word into a floating point word; perform the bit shifting operation on the floating point word by performing the MAC operation; and convert the floating point representation into an output binary word, wherein the compressed data signal comprises the output binary word.

The bit shifting operation may be a right shifting operation, the MAC operation including multiplying the floating point word by $2^{-n}$, where n is the number of bits to be right shifted.

The bit shifting operation may be a left shifting operation, the MAC operation including multiplying the floating point word by $2^{n}$, where n is the number of bits to be left shifted.

The system may be a 5G radio data communications system.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
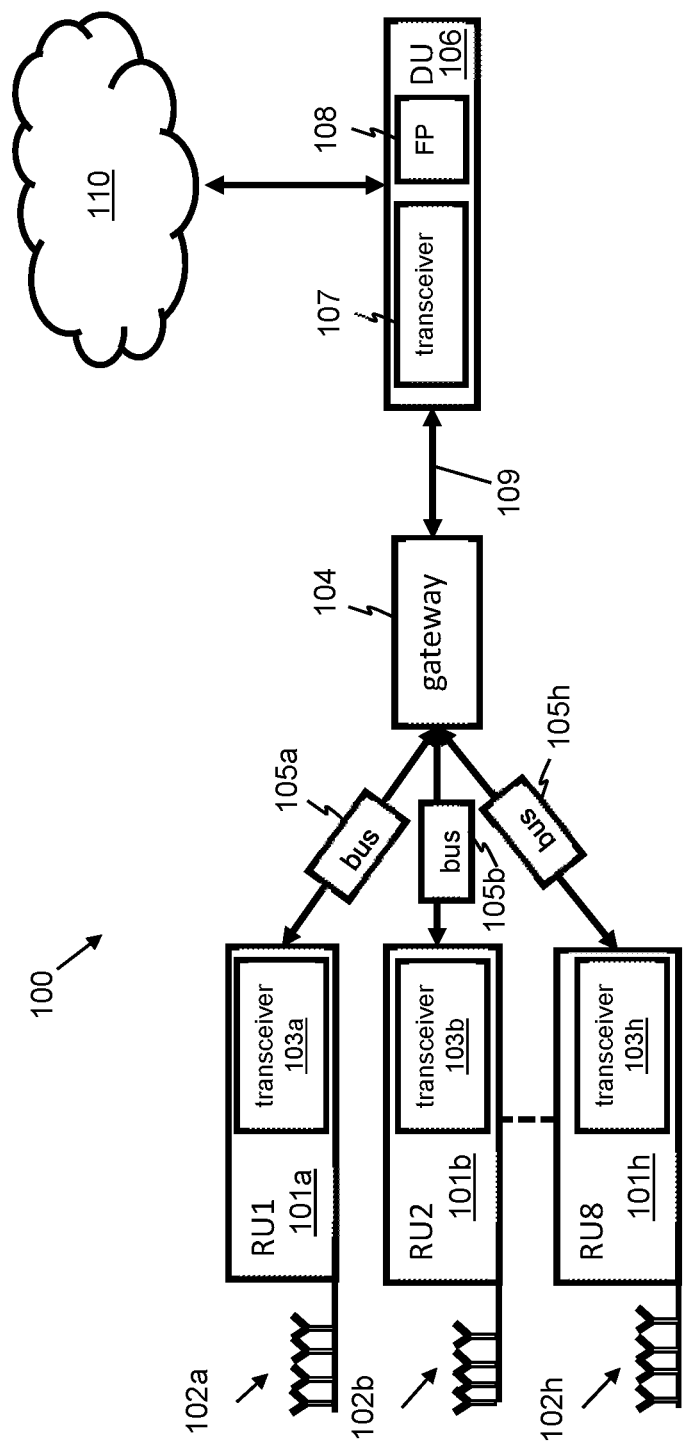
FIG. 1 is a schematic diagram of an example radio data communication system.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates an example radio data communications system 100. The radio data communications system 100 may be a 5G radio data communications system. The radio data communications system 100 comprises a plurality of radio units RU1-RU8 101a-h. Each radio unit 101a-h comprises a transceiver 103a-h and an antenna, in this example in the form of an antenna array 102a-h. A gateway unit 104 is connected to each of the plurality of radio units 101a-h via a first data bus 105a-h. The first data bus 105a-h may comprise multiple data buses or a single data bus with multiple connections to each of the radio units 101a-h.

A distribution unit (DU) 106 receives data transmitted by the gateway unit 104 via a second data bus 109. The DU 106 comprises a transceiver 107 for receiving and sending data via the second data bus 109 and a further processing unit 108 for processing data prior to sending data to a data network 110. Further processing may comprise radio link control (RLC) operations, medium access control operations and physical layer operations.

The data network 110 may be, or may be connected to, the internet, and enables the radio data communications system 100 to connect to other radio data communications systems and other systems connected to the data network 110.

Embodiments described herein will be described with respect to receiving and compressing data, but it is appreciated that the inverse procedure may be carried out to decompress and transmit data using the radio data communications system 100.

Each transceiver 103a-h is configured to receive a data signal from a respective antenna 102a-h. In an example 5G network, each of the received data signals may comprise 16-bit IQ data. The plurality of radio units 101a-h may be located in different locations such as different rooms or floors of a building. Therefore, each of the data signals received via the antennas 102a-h may be different.

Each transceiver 103a-h is further configured to compress the received data signal using a data compression algorithm and transmit the compressed data signal to the gateway unit 104 via the data bus 105a-h. The data compression algorithm includes a bit shifting operation performed by a multiply-accumulate (MAC) operation. The data compression algorithm may, for example, compress the received data signal from a 16-bit input data signal to a 6-15 bit output data signal, thereby reducing data throughput on the data bus 105a-h.

Figure 2:
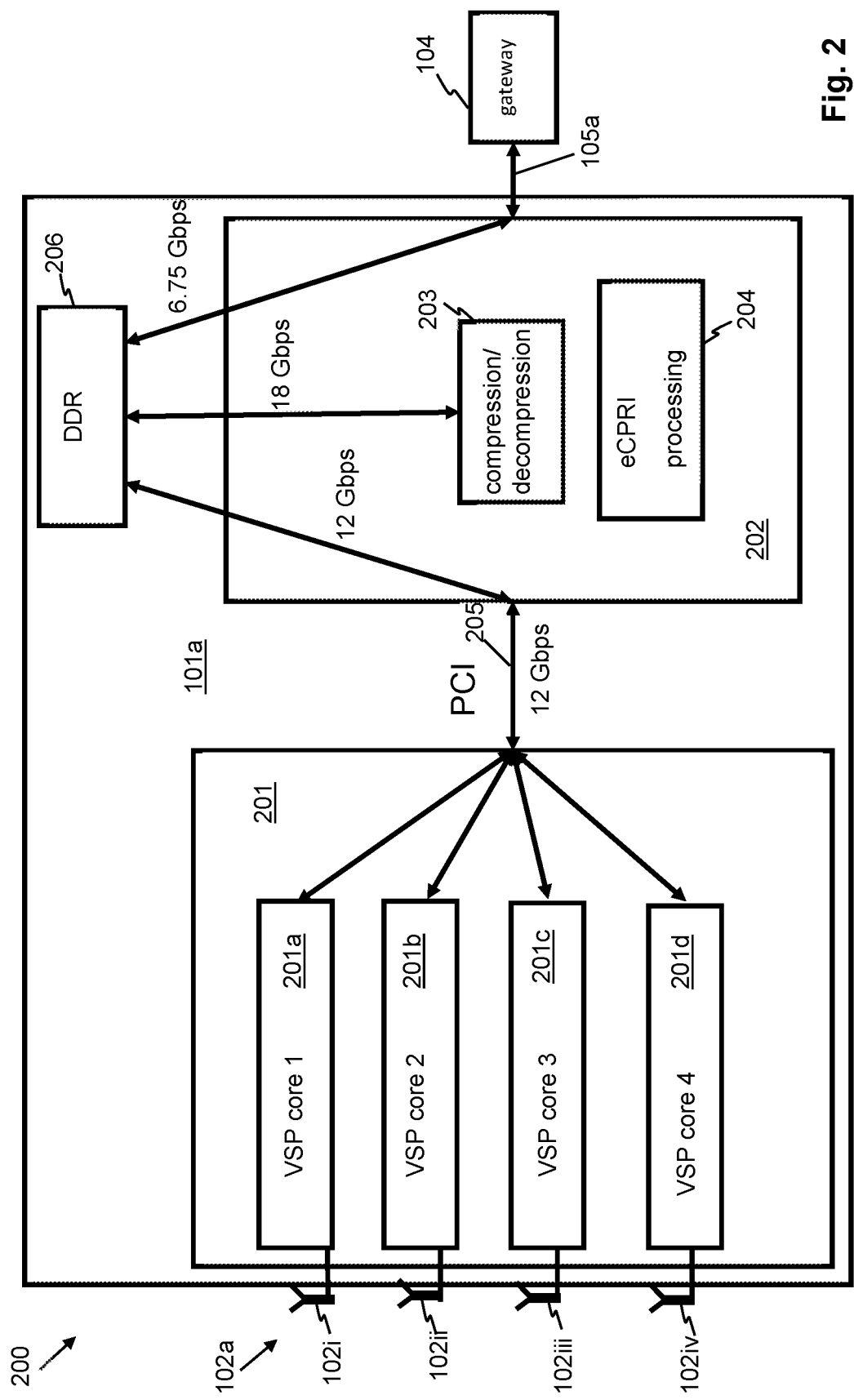
FIG. 2 is a schematic diagram of a first example radio data communication system.

FIG. 2 illustrates a first example radio data communication system 200, illustrating one of the radio units 101a connected to the gateway 104 via the first data bus 105a. The radio unit 101a comprises a vector signal processor (VSP) 201 comprising a plurality of processor cores 201a-d, each core 201a-d connected to a respective antenna 102i-102iv of the antenna array 102a. The VSP cores 201a-d are connected to a digital signal processor (DSP) 202 via a PCI (peripheral component interconnect) bus 205. The DSP 202 comprises a compression/decompression module 203 and an eCPRI processing module 204. A DDR bus 206 carries data to and from the PCI bus 205, the compression/decompression module 203 and the first data bus 105a.

The DSP 202 is typically a device such as an ARM LX/LS device, which carries out compression and decompression and eCPRI processing for transmission and reception of signals via the first data bus 105a. Such a device may incur a high power consumption and be a significant cost of the system 200. A high DDR bandwidth is also incurred, together with a high bandwidth on the PCI bus 205.

Each of the VSP cores 201a-d may comprise an array of multiply accumulate units configured to perform multiply-accumulate operations. A multiply accumulate (MAC) operation computes the product of two numbers S0*S1 and adds that product to an accumulator S2 to create an output V=S0*S1+S2. To obtain high precision, floating point MAC units are usually used. Each of the cores 201a-d may have a simplified instruction set which only supports MAC instructions and do not support bit operation instructions such as shift/and/or that are required to perform open RAN compression algorithms.

The VSP 201 may for example be an NXP LA12xx series processor, such as an LA1200 programmable baseband processor. The NXP LA12xx series of devices contain 8 VSPA cores, with each core capable of performing 128 MAC operations per cycle.

The DSP 202 supports bit operation instructions such as shift/and/or so that the compression module 203 is capable of performing open RAN compression algorithms such as block floating, block scaling and u-law operations. The eCPRI module 204 sends and receives compressed data to and from the gateway unit 104 via the first data bus 105a.

Figure 3:
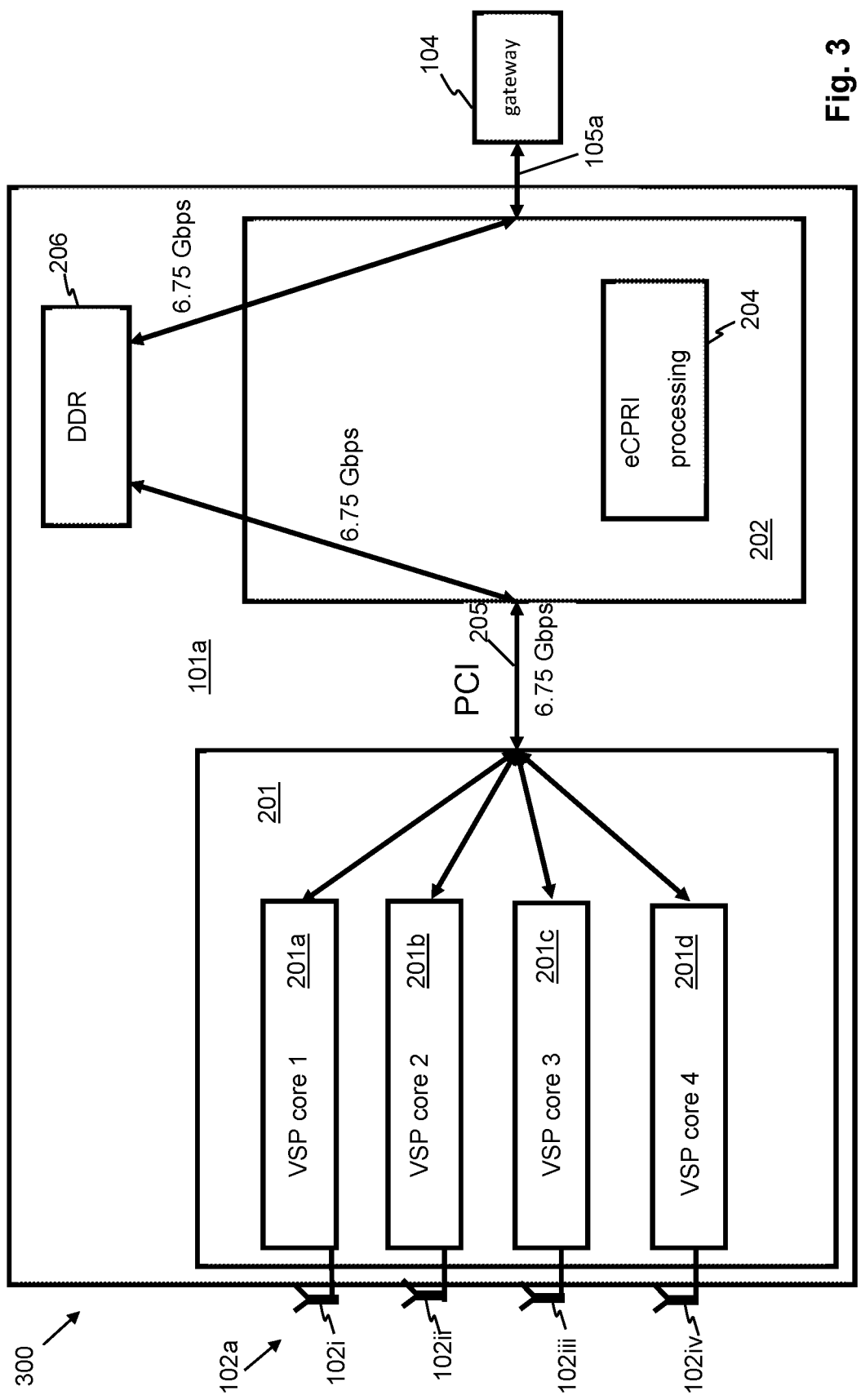
FIG. 3 is a schematic diagram of a second example radio data communication system.

FIG. 3 illustrates an example radio data communication system 300 according to an embodiment. As for the radio data communication system 200 of FIG. 2, the radio data communication system 300 of FIG. 3 comprises a multi-core VSP 201 and a DSP 202. In this embodiment, however, compression and decompression of the data signals is carried out within each VSP core 201a-d instead of by the DSP 202. The DSP performs eCPRI processing but does not perform data compression or decompression. As a result, a lower DDR bandwidth is required and a lower power consumption results from using the lower power VSP cores. The system 300 operates otherwise similarly to that of FIG. 2 and may comprise similar components, for example the NXP LA12xx VSP and the ARM LX/LS DSP.

Each of the VSP cores 201a-d is capable of performing bit shifting operations required for compression and decompression using MAC operations. Performing the compression algorithms in-situ on each of the cores 201a-d reduces the bandwidth required on the connection between the VSP 201 and the DSP 202.

Figure 4:
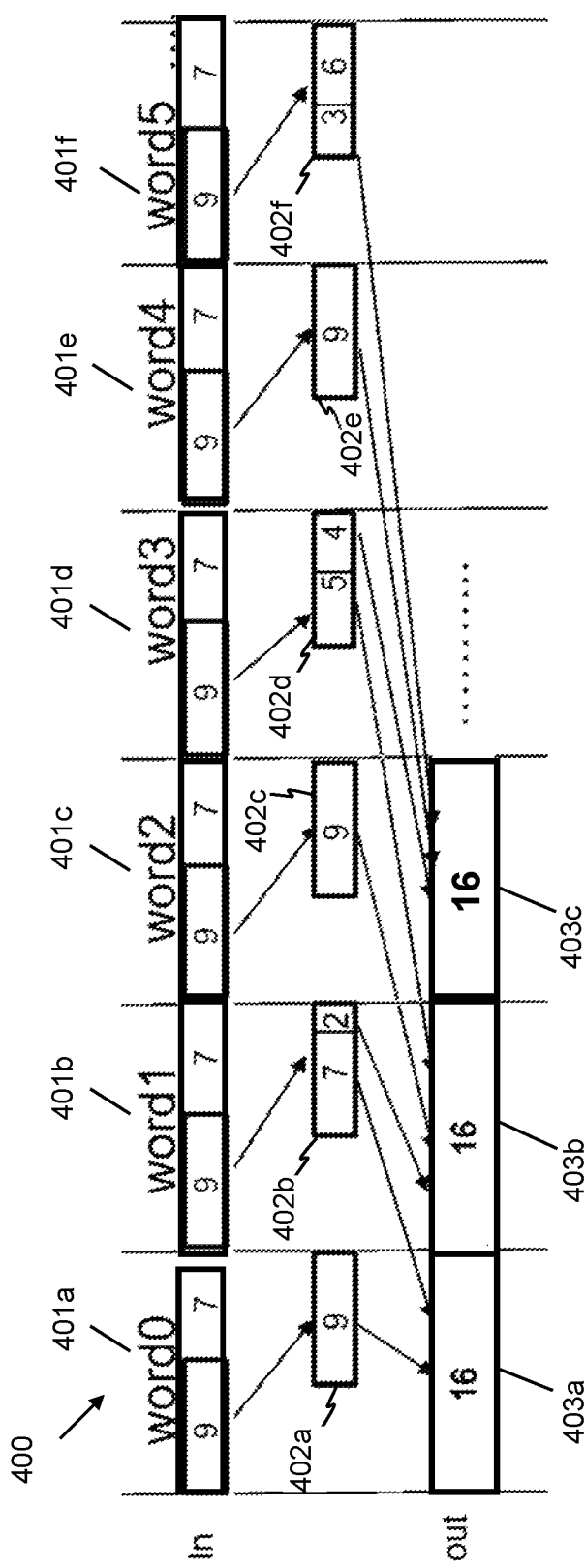
FIG. 4 is a schematic diagram of an example block floating point algorithm.

FIG. 4 illustrates an example compression algorithm 400 that may be used in a 5G radio data communication system. In a 5G system, the compression and concatenation algorithm of FIG. 4 is carried out on each resource block, a resource block being a block of 12 resource elements with 12 IQ samples, each sample having a 16 bit I and a 16 bit Q portion. Normalisation is carried out on the IQ samples and extraction of the 9 MSBs of each IQ sample to form the output data stream.

A received data signal comprising input binary words 401a-f, in this case with each word 401a-f having 16 bits, is compressed to a compressed data signal comprising compressed binary words 402a-f, each compressed word 402a-f in this case having 9 bits. The compressed binary words 402a-f are then concatenated to form a compressed data signal having output binary words 403a-c, each of the output binary words 403a-c in this case having 16 bits. The algorithm transforms each input binary word 401a-f by taking the 9 most significant bits (MSBs) and discarding the 7 least significant bits (LSBs). The compressed words 402a-f, being right shifted by 7 bits, are concatenated by splitting some of the words into two parts and joining these into output binary words 403a-c having 16 bits. In this example, 6 words of the input stream are compressed to an output stream of 3 words.

The algorithm may be defined in part by the following pseudo code operations:

```
extract_word(n) = in_word(n)>>7. (n=0,1,..,23)
extract_h_word(1) = extract_word(1)>>2
extract_l_word(1) = extract_word(1) - (extract_h_word(1)<<2)
extract_h_word(3) = extract_word(3)>>4
extract_l_word(3) = extract_word(3) - (extract_h_word(1)<<4)
out_word(0) = (extract_word(0)<<7)+(extract_h_word(1));
out_word(1) = (extract_l_word(1) << 14)+(extract_word(2)<<5)+(extract_h_word(3);
```

The instructions required to perform the algorithm include right shift, left shift, add and subtract. A difficulty with using a vector signal processor such as the LA12xx VSPA is that the cores are not designed to process logic shift operations as these are not available within vector bit operations. The instructions available in such a VSP include MAC, multiply, add and subtract. Right shift and left shift instructions are not available. Such operations can, however, be performed by using MAC operations that are available in a VSP, as described below.

For right shift operations, the following sequence of operations may be used:

1. Convert an input signed 16-bit word A (short A) into a 32-bit floating point word B: B=(float)A.
2. Convert the representation of the word B, if required. C=B if B is positive, while C=B*(-1)+(-32768) if B is negative. This is because short A will be in two's complement representation, in which the MSB indicates the sign, while float B is in original code representation, for positive data the 2 representations are same, but for negative data the 2 representation is converted by original representation=-32768-2's complement representation, just like -1 is represented by 0xFFFF.
3. Right shift: multiply by $2^{-n}$, to obtain $D=C*2^{-n}+0$. In this operation, a right shift of 1 bit involves dividing the data by 2 (or multiplying by 0.5).
4. Shift the sign bit. E=D if D is positive, $E=D*(-1)+2^{15-n}$ if D is negative. This step is because sign bit remains at the same place (the MSB) after step 3 for negative data. This step will clear the sign bit by multiplying by -1, and set a bit at expected place according to required shift number.
5. Convert the float back to 16-bit word. F=(short)E.

Figure 5:
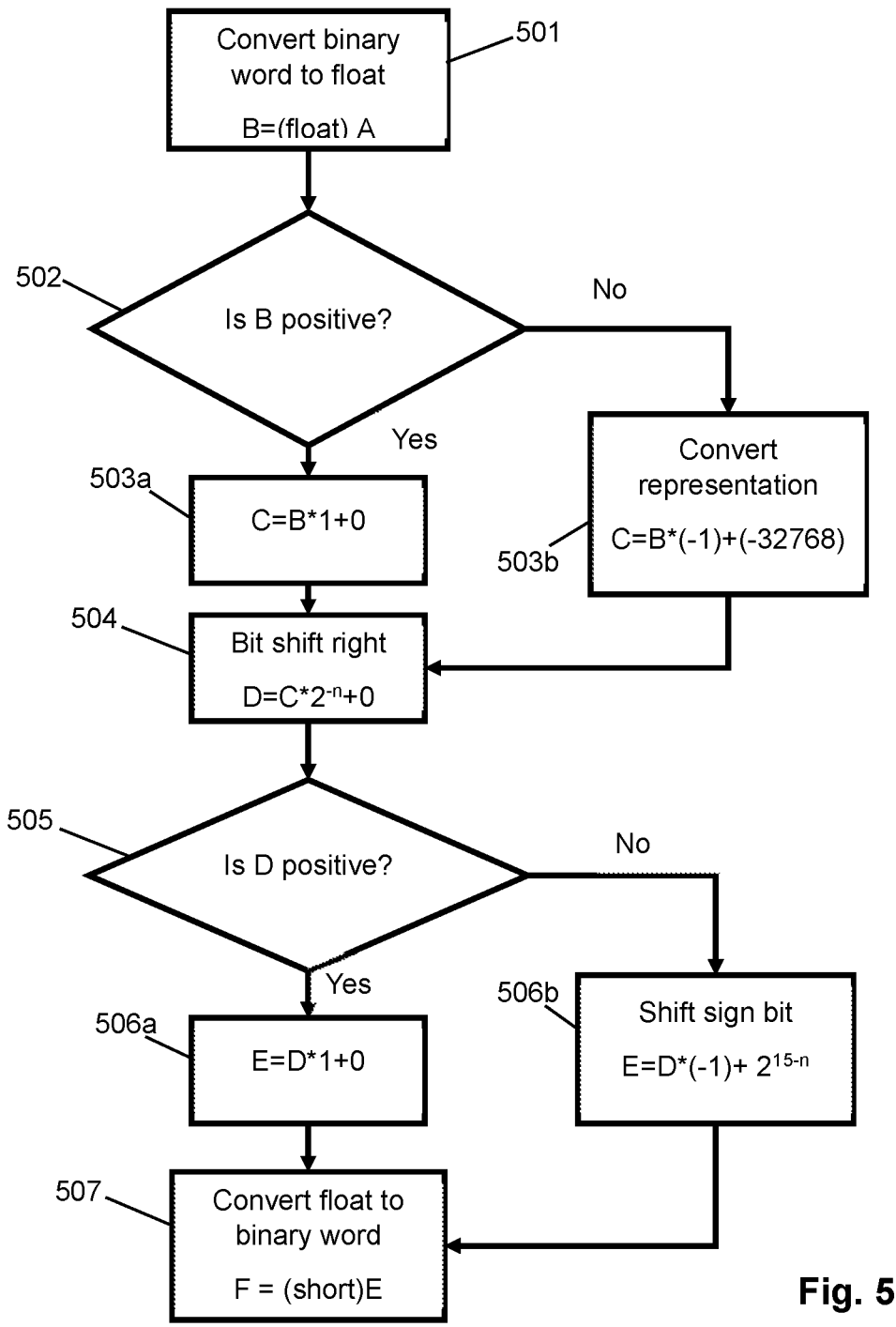
FIG. 5 is a flow diagram illustrating an example algorithm for performing a right bit shift.

FIG. 5 is a flow chart illustrating the above example algorithm for performing a right bit shift using MAC operations. At step 501 an input binary word is converted into a floating point word (float), the float being described by a greater number of bits than the binary word. In this particular embodiment the binary word is a signed 16-bit binary word A and the float is a 32-bit float B.

At step 502 a determination is made as to whether or not the float B is positive or negative. If float B is positive, then the two representations are the same and the algorithm proceeds to step 503a where it performs the operation C=B*1+0, transforming float B into float C. If float B is negative then the algorithm proceeds to step 503b where the contents of the float are converted from two's complement representation to original code representation. This is done by clearing the sign bit on the float and subtracting the value of the most significant bit in the binary word from the float. For 16 bit words, the value of the most significant bit is $2^{15}$=32768, resulting in the operation for step 503b being C=B*(-1)+(-32768), transforming float B into float C.

The algorithm then proceeds to step 504 where a right bit shift operation is performed. The right bit shift operation is performed multiplying the float by a scaling factor ($D=C*22^{-n}+0$), transforming float C into float D. The scaling factor comprises an exponential function $2^{-n}$ wherein the base of the exponential function corresponds to the base of the binary word (base 2). The exponent n of the exponential function is the number of bit shifts, i.e. how many places to the right the original binary word is desired to be shifted by. The sign on the exponential dictates that a right bit shift will decrease the value of float D by a factor of two and a left bit shift will increase the value of D by a factor of two.

At step 505, a determination is made as to whether or not float D is positive. This is because the sign bit will have remained in the same place (the MSB) after step 504 for negative data because in two's complement form the only negative bit is the MSB. If float D is positive, then there is no sign bit and the two representations are the same. In this situation, the right shift algorithm proceeds to step 506a and performs the operation E=D*1+0, transforming float D into float E. If float D is negative, then the algorithm proceeds to step 506b, where the sign bit is shifted by clearing the sign bit of the float and setting a bit in the float n places to the right of the most significant bit of the binary word, where n is the number of bit shifts (E=D*(−1)+$2^{15-n}$), transforming float D into float E. For example, if the algorithm was instructed to shift the binary word A two places to the right, step 506a would produce a bit at a position $2^{15-2}=2^{13}$. This is two places to the right of the most significant bit of the binary word E (position $2^{15}$).

Finally, at step 507 the float E is converted back into a binary word, transforming float E into binary word F. Table 1 below illustrates the right shift algorithm 400 being performed on input data A=0x3333 and A=0-AAAA, respectively, for a right bit shift of 7.

converted to a float in an identical manner to step 501 in FIG. 5. The algorithm then proceeds to step 602 where a left bit shift operation is performed in an analogous manner to step 504 of FIG. 5, with the sign of the exponent reversed to account for the direction of the bit shift being a left bit shift instead of a right bit shift, the operation being defined by C=B*$2^n$+0.

The algorithm then proceeds to step 603 where a determination is made as to whether the value of float C is greater than the MSB of the binary word A by performing the operation S=C*1−32768 at step 603. At step 604 the sign of S is determined. If S is negative, then the algorithm proceeds to step 605a and performs the operation D=C*1+0, transforming float C into float D. If S is positive, then the algorithm proceeds to step 605b. The value of the float C is greater than the MSB of the binary word A and this MSB should be regarded as the sign bit. This is achieved by converting the sign bit by multiplying the float by minus 1 and adding the value of the most significant bit of the binary word, such that there will be a nonzero entry in the most significant bit column when the float is converted back into a binary word (D=C*(−1)+32768). This transforms float C into float D.

At step 606, a determination is made as to whether D is positive or negative and D either remains unchanged at step 607a or has its representation converted at step 607b in an similar manner to FIG. 5 in steps 502, 503a and 503b. This transforms float D into float E.

Finally, at step 608, float E is converted back into a binary word F in a similar manner to FIG. 5 step 507.

TABLE 1

Example right shift algorithm for shifting 7 bits

| Steps | Input data A = 0x3333 | Input data A = 0xAAAA |
|---|---|---|
| 1. B = (float)A | 13107 | −21846 |
| 2. C = B*1 + 0 if positive, C = B*(−1) + (−32768) if negative | 13107 | −10.922 |
| 3. D = C*$2^{-7}$ + 0 | 102.3984375 | −85.328125 |
| 4. E = D*1 + 0 if positive, E = D*(−1) + $2^8$ if negative | 102.3984375 | 341.328125 |
| 5. F = (short)E | 0x0066 = (0x3333 >> 7) | 0x0155 = (0xAAAA>>7) |

For left shift operations, the following sequence of operations may be used:
1. Convert signed 16-bit word A (short A) into 32-bit float B, B=(float)A.
2. Left shift: Multiply by $2^n$, C=B*$2^n$+0.
3. Convert the sign bit: S−C*1−32768. D−C if S is negative, D=(C−32768)*(−1)=C*(−1)+32768 if S is positive. This is because, when the data value gets bigger than 32768 after a left shift operation (i.e. the MSB is 1), the MSB bit should be regarded as sign bit.
4. Convert representation: E=D if D is positive, E=D*(−1)+(−32768) if D is negative.
5. Convert the float back to 16-bit word. F=(short)E.

It should be noted that the input to the left shift solution should meet the condition that, after left shifting, the value does not exceed the range of 16 bits.

Figure 6:
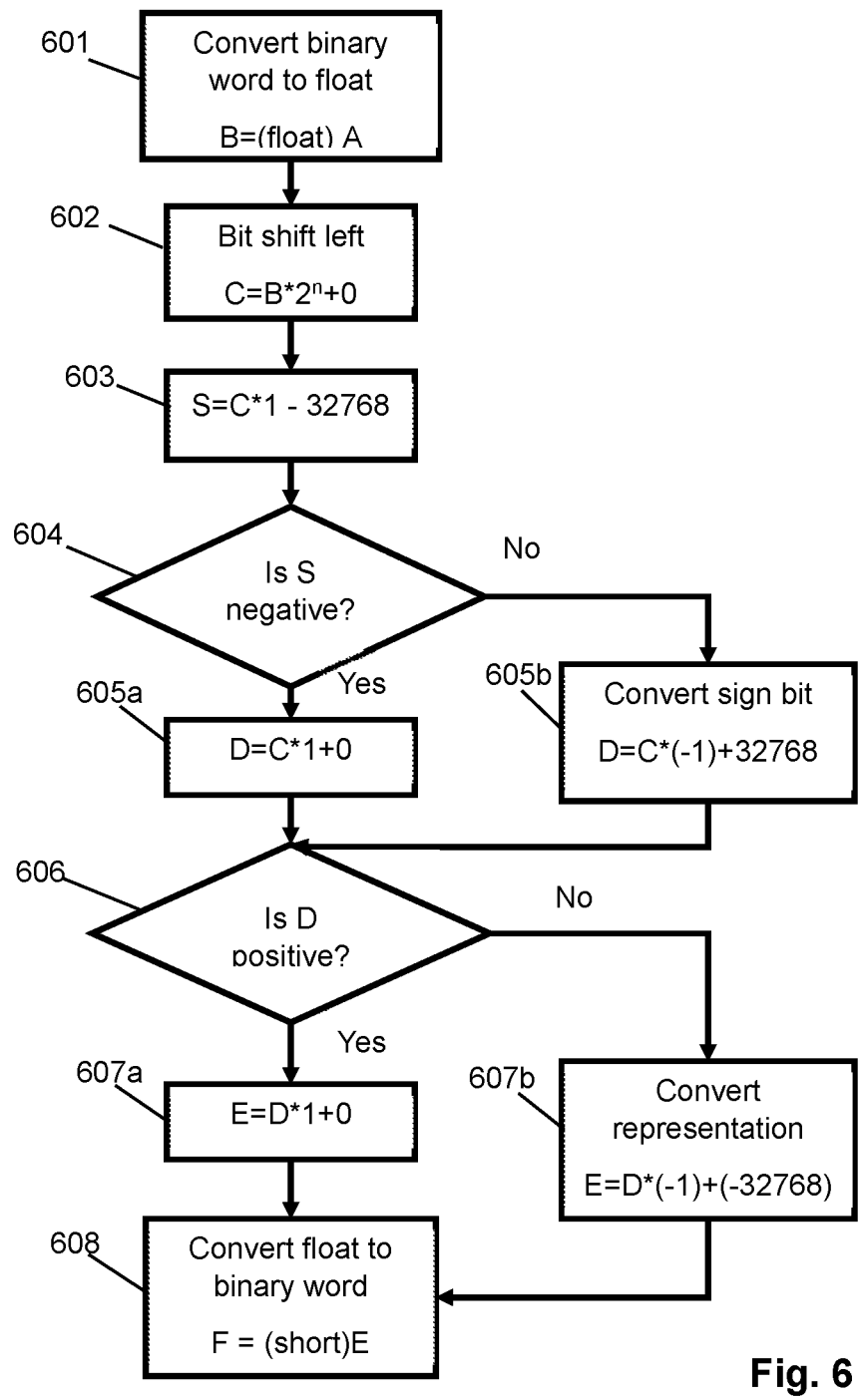
FIG. 6 is a flow diagram illustrating an example algorithm for performing a left bit shift operation.

FIG. 6 is a flow diagram illustrating the above example algorithm for performing a left bit shift operation using MAC operations. At step 601 an input binary word A is MAC operations may also be used as part of an algorithm to perform concatenation, i.e. the step of concatenating words having a reduced number of bits into fewer words having a greater number of bits, as described above in relation to FIG. 4. For concatenation of two words A and B having respectively m bits and n bits, the following steps are carried out:
1. Convert 2 signed 16-bit word A,B (short A,B) into a 32-bit float C,D, C=(float) A and D=(float)B.
2. Concatenate. E=C*$2^n$+D.
3. Convert the sign bit S=E*1−32768: F=E if S is negative, F=(E−32768)*(−1)=E*(−1)+32768 if S positive.
4. Convert representation: G=F if F is positive, G=F*(−1)+(−32768) if F is negative.
5. Convert the float back to 16-bit word. H=(short)G.

Figure 7:
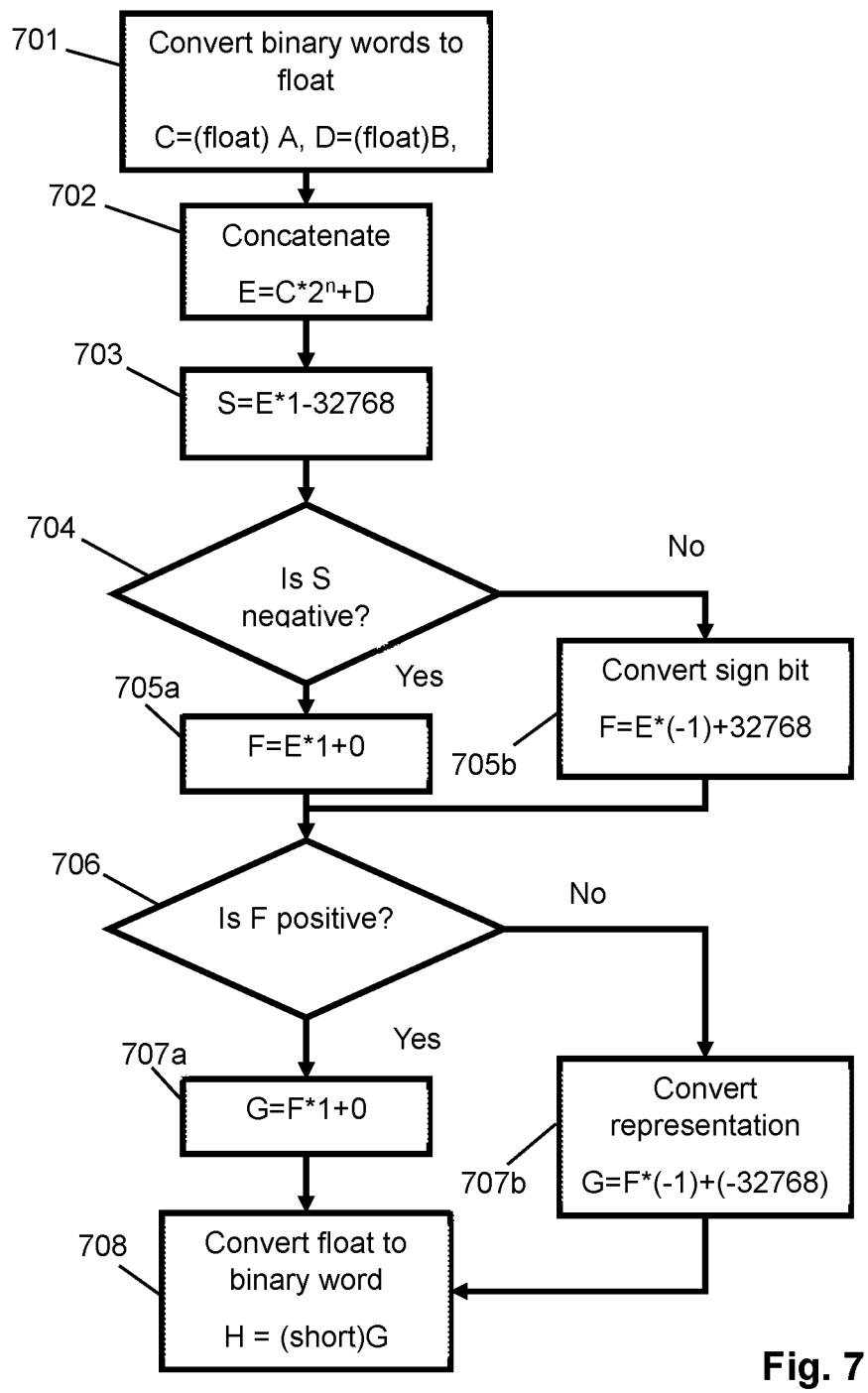
FIG. 7 is a flow diagram illustrating an example algorithm for performing a concatenation operation.

FIG. 7 is a flow diagram illustrating the above algorithm. At step 701, two input binary words A (m bits) and B (n bits) are converted into floats C and D. The algorithm then proceeds to step 702 where floats C and D are concatenated.

This operation is performed by multiplying float C by a scaling factor $2^n$. This scaling factor $2^n$ shifts float C to the left by the number of bits of the binary word B, allowing room for float D at the start of the binary word when converted. Float D is added to the result, giving $E=C*2^n+D$.

The algorithm then proceeds to step 703 where a determination is made as to whether the value of float E is greater than the MSB of the binary words C, D. At step 704, the sign of S is determined as S=E*1−32768. If S is negative, then the algorithm proceeds to step 705a and performs the operation F=E*1+0. If S is positive, then the algorithm proceeds to step 705b and performs the operation F=E*(−1)+32768.

At step 706, a determination is made as to whether or not the float F is positive or negative and the float F either remains unchanged at step 707a(G=F*1+0) or has its representation converted at step 707b(G=F*(−1)+(−32768)). Finally, at step 708 the float G is converted back into a binary word F.

Figure 8:
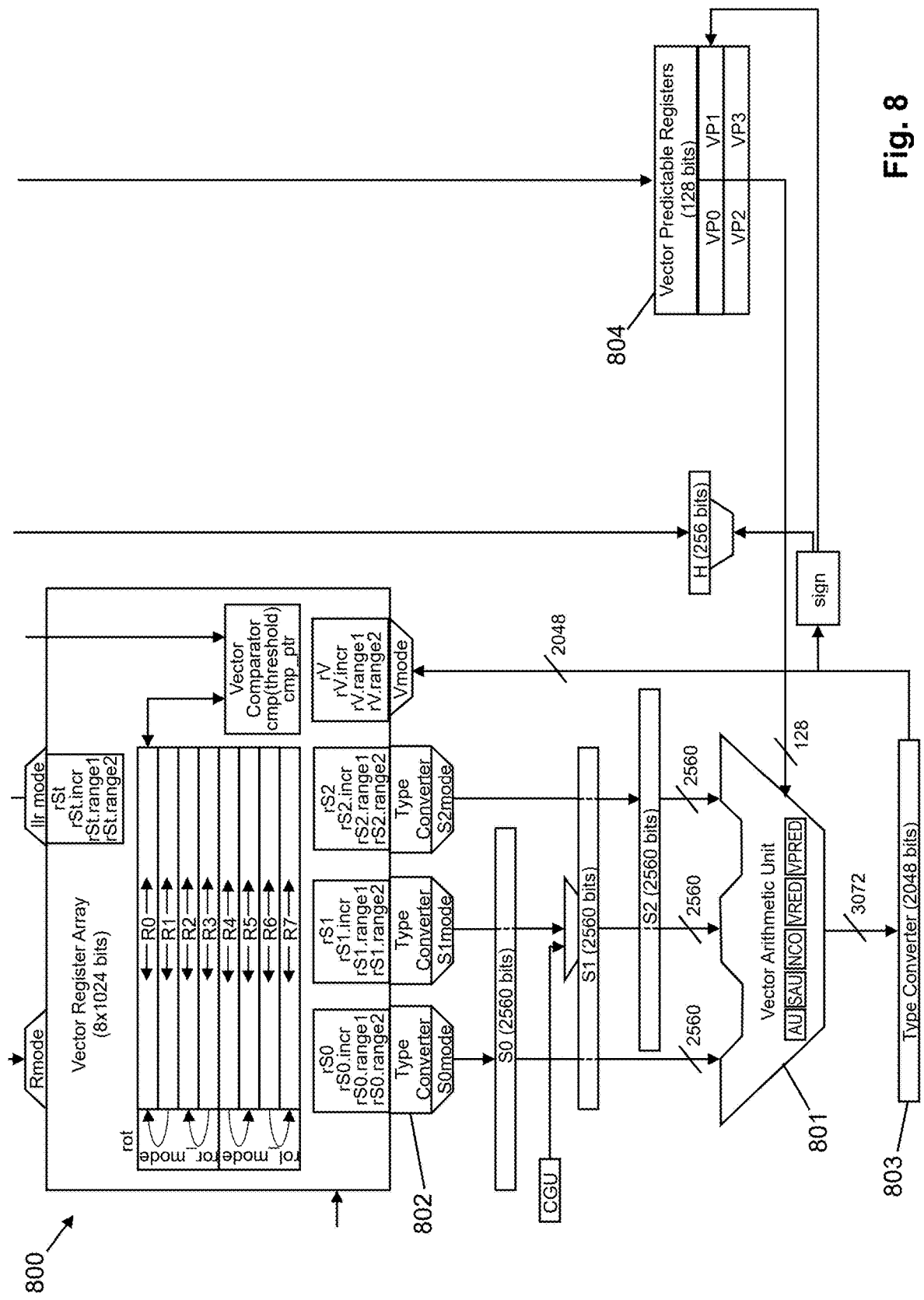
FIG. 8 is a schematic diagram of an example vector signal processing architecture (VSPA) core.

FIG. 8 is a schematic diagram of an example VSPA core having an array of MAC units within a vector arithmetic unit (VAU) 801. The VAU 801 is capable of performing MAC operations V=S0*S1+S2, where V, S0, S1 and S2 have a length of 128 16-bit data. Instructions according to Table 1 above are mapped on to the VSPA core 800. Steps 1 and 5 are carried out by respective type converters 802, 803 when data is respectively loaded and stored, while steps 2, 3 and 4 are carried out by the arithmetic unit AU of the VAU 801, using vector predicate registers 804. In Table 2 below, the function rmad is a MAC instruction to perform the operation V=S0*S1+S2.

TABLE 2

Mapping a right bit shifting operation to the VSPA core of FIG. 8.

| Steps | Done by instructions |
| --- | --- |
| 1. B = (float)A | type converter during loading data |
| 2. C = B*1 + 0 if B*1 + 0 is positive,<br>C = B*(−1) + (−32768) if negative | 1. rmad.uvp to do B*1 + 0 and update condition flag according to sign of result<br>2. rmad.vpnz to calculate C in difference way according to condition flag |
| 3. D = $C*2^{-7}$ + 0. | 3. rmad.uvp to calulate D and update condition flag according to sign of result |
| 4. E = D*1 + 0 if D is positive,<br>E = D*(−1) + $2^8$ if negative | 4. rmad.vpnz to calculate E in difference way according to condition flag |
| 5. F = (short)E | type converter during storing data |

Figure 9:
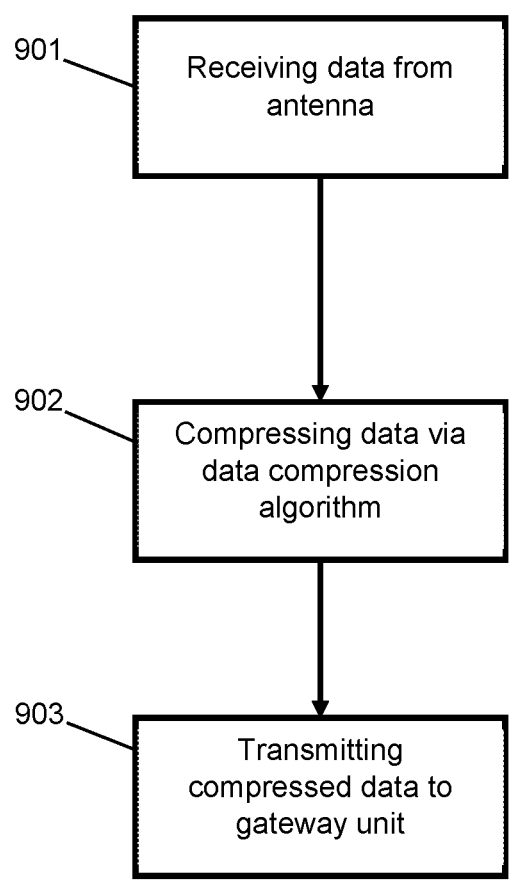
FIG. 9 is a flow diagram illustrating an example method of compressing a data signal in a radio data communications system.

FIG. 9 is a simplified flow diagram illustrating an example method of compressing a data signal in a radio data communication system according to the present disclosure. In a first step 901 a data signal is received from an antenna. In a second step 902, the received data signal is compressed using a data compression algorithm. In a third step 903, the compressed data signal is transmitted to a gateway unit via a data bus.

From reading the present disclosure, other variations and modifications will be apparent to the skilled person. Such variations and modifications may involve equivalent and other features which are already known in the art of radio data communication systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A radio data communication system comprising:
   a plurality of radio units, each radio unit having a transceiver and an antenna; and
   a gateway unit connected to each of the plurality of radio units via a first data bus,
      wherein each transceiver in the plurality of radio units is configured to:
      receive a data signal from a respective antenna;
      compress the received data signal using a data compression algorithm; and
      transmit the compressed data signal to the gateway unit via the first data bus,
   wherein the transceiver of each radio unit comprises a vector signal processor configured to perform the data compression algorithm,
   wherein the data compression algorithm includes a bit shifting operation performed by a multiply-accumulate (MAC) operation,
   wherein the received data signal comprises input binary words having a first number of bits and the compressed data signal comprises binary words having a second number of bits, the second number being less than the first number, and
   wherein the data compression algorithm concatenates the compressed data signal using a second MAC operation to provide the compressed data signal with output binary words having the first number of bits.

2. The radio data communication system of claim 1, further comprising a distribution unit configured to:
   receive the compressed data from the gateway unit via a second data bus;

decompress the compressed data; and
transmit the decompressed data to a data network.

3. The radio data communication system of claim 1, wherein the first number is 16 and the second number is selected from a range of from 6 to 15.

4. The radio data communication system of claim 1 wherein, for each input binary word in the received data signal, the data compression algorithm:
converts the input binary word into a floating point word;
performs the bit shifting operation on the floating point word by performing the MAC operation; and
converts the floating point representation into an output binary word,
wherein the compressed data signal comprises the output binary word.

5. The radio data communication system of claim 4, wherein the bit shifting operation is a right shifting operation, the MAC operation including multiplying the floating point word by $2^{-n}$, where n is the number of bits to be right shifted.

6. The radio data communication system of claim 4, wherein the bit shifting operation is a left shifting operation, the MAC operation including multiplying the floating point word by $2^n$, where n is the number of bits to be left shifted.

7. The radio data communication system of claim 1, wherein the system is a 5G radio data communications system.

8. A method of compressing a data signal in a radio data communication system including a plurality of radio units and a gateway unit connected to each of the plurality of radio units via a first data bus, each radio unit having a transceiver and an antenna, the method comprising each transceiver in the plurality of radio units:
receiving a data signal from a respective antenna;
compressing the received data signal using a data compression algorithm; and
transmitting the compressed data signal to the gateway unit via the first data bus,
wherein the data compression algorithm is performed by a vector signal processor on each radio unit,
wherein the received data signal comprises input binary words having a first number of bits and the compressed data signal comprises binary words having a second number of bits, the second number being less than the first number,
wherein the data compression algorithm includes a bit shifting operation performed by a multiply-accumulate (MAC) operation,
wherein the data compression algorithm concatenates the compressed data signal using a second MAC operation to provide the compressed data signal with output binary words having the first number of bits.

9. The method of claim 8, wherein the radio data communication system further comprises a distribution unit, the method further comprising:
the distribution unit receiving the compressed data from the gateway unit via a second data bus;
decompressing the compressed data; and
transmitting the decompressed data to a data network.

10. The method of claim 8, wherein the first number is 16 and the second number is selected from a range of from 6 to 15.

11. The method of claim 8 wherein, for each input binary word in the received data signal, the data compression algorithm includes:
converting the input binary word into a floating point word;
performing the bit shifting operation on the floating point word by performing the MAC operation; and
converting the floating point representation into an output binary word, wherein the compressed data signal comprises the output binary word.

12. The method of claim 11, wherein the bit shifting operation is a right shifting operation, the MAC operation including multiplying the floating point word by $2^{-n}$, where n is the number of bits to be right shifted.

13. The method of claim 11, wherein the bit shifting operation is a left shifting operation, the MAC operation including multiplying the floating point word by $2^n$, where n is the number of bits to be left shifted.

14. The method of claim 8, wherein the system is a 5G radio data communications system.

* * * * *